(12) United States Patent
Zaiser et al.

(10) Patent No.: US 9,260,063 B2
(45) Date of Patent: Feb. 16, 2016

(54) COMPOSITE TRUCK BOX

(71) Applicants: Jarrad Scott Zaiser, Missouri City, TX (US); Bruce Edward Toman, Missouri City, TX (US)

(72) Inventors: Jarrad Scott Zaiser, Missouri City, TX (US); Bruce Edward Toman, Missouri City, TX (US)

( * ) Notice: Subject to any disclaimer, the term of this patent is extended or adjusted under 35 U.S.C. 154(b) by 161 days.

(21) Appl. No.: 14/099,491

(22) Filed: Dec. 6, 2013

(65) Prior Publication Data
US 2015/0158436 A1 Jun. 11, 2015

(51) Int. Cl.
*A47B 97/00* (2006.01)
*B60R 11/06* (2006.01)

(52) U.S. Cl.
CPC ...................................... *B60R 11/06* (2013.01)

(58) Field of Classification Search
CPC ................................ B60R 11/06; A47B 97/00
See application file for complete search history.

(56) References Cited

U.S. PATENT DOCUMENTS

| | | | | |
|---|---|---|---|---|
| 4,469,364 A * | 9/1984 | Rafi-Zadeh | ................... | 296/37.6 |
| 4,733,898 A * | 3/1988 | Williams | ................... | 296/24.32 |
| 4,946,215 A * | 8/1990 | Taylor | ......................... | 296/37.6 |
| 5,924,616 A * | 7/1999 | Shives | ........................ | 224/404 |
| 5,964,492 A * | 10/1999 | Lyon | .............................. | 296/37.6 |
| 5,992,719 A * | 11/1999 | Carter, III | ..................... | 224/404 |
| 6,533,344 B1 * | 3/2003 | Patterson | ................. | 296/100.06 |
| 6,634,691 B2 * | 10/2003 | Henderson | ................... | 296/37.6 |
| 7,052,066 B2 * | 5/2006 | Emery et al. | ................. | 296/37.1 |
| 7,530,618 B2 * | 5/2009 | Collins et al. | ................ | 296/37.6 |
| 8,256,820 B2 * | 9/2012 | Spencer | ........................ | 296/37.6 |
| 8,662,558 B1 * | 3/2014 | Kolb et al. | .................... | 296/37.6 |
| 2005/0029275 A1 * | 2/2005 | Baughman | .................... | 220/845 |
| 2006/0102669 A1 * | 5/2006 | Fouts et al. | .................... | 224/404 |
| 2008/0297346 A1 * | 12/2008 | Brackmann et al. | ....... | 340/572.1 |

* cited by examiner

*Primary Examiner* — Brian D Nash
(74) *Attorney, Agent, or Firm* — Benjamin A. Adler

(57) ABSTRACT

Provided herein are truck boxes, such as pickup truck toolboxes, that comprise an open box body and lid assembly fabricated from composite materials. The composite materials may be fiber-reinforced polymeric constructs and may have a solid laminate structure or a sandwich structure utilizing a plurality of plies. Also provided are composite toolboxes that have an open storage box and lid component affixed to an upper back edge of the box component in an opening and closing relationship and means for independently hinging and latching the lid component to the open storage box component. The open storage box and lid in the pickup truck tool box may each independently comprise a ply layup of fiber reinforced polymeric composites or may each independently comprise a solid laminate of a fiber reinforced polymeric composite.

21 Claims, 4 Drawing Sheets

COMPOSITE TRUCK BOX

BACKGROUND OF THE INVENTION

1. Field of the Invention

The present invention relates generally to the fields of pickup truck boxes. More specifically, the present invention relates to a toolbox for a pickup truck substantially structurally comprising lightweight composite materials.

2. Description of the Related Art

A truck toolbox is a storage unit that can be mounted in the pickup truck bed on, for example, the bed rails or the floor of the bed itself. The toolbox can comprise one or more lids and latches/locking mechanisms. Currently, a majority of the toolboxes are made of aluminum and steel, as a quick search of the internet will corroborate. Moreover, some injection molded plastic truck boxes have been manufactured. For example, U.S. Pat. No. 5,601,206 and U.S. Pat. No. 6,439,649 discloses a pickup truck box made from molded plastic. However, these toolboxes are subject to corrosion, impact damage and wearing or fading of surface colors and/or patterns. Although less subject than metal truck boxes, plastic truck boxes still are susceptible to such damage, particularly impact damage and wear.

Composite materials offer a number of advantages over the metal and pure plastic counterparts. Although U.S. Pat. No. 8,544,708 discloses a folding toolbox for a pickup truck that can comprise a composite material, these materials are laminated between sheets or plates of metal or plastic. This toolbox would still be subject to corrosion and wearing, etc.

Thus, there is a recognized need in the art for truck toolboxes of equivalent strength to known toolboxes that are lighter weight but of equivalent strength to known truck boxes, more corrosion resistant and with improved impact resistance, customizable and protected colors and patterned designs built into the structure. The prior art is deficient in a sturdy, lightweight toolbox for a pickup truck. Particularly, the prior art is deficient in truck toolboxes made from composite materials for a sturdy, wear-resistant and lightweight product. The present invention fulfills this longstanding need and desire in the art.

SUMMARY OF THE INVENTION

The present invention is directed to a truck box. The truck box comprises an open box body and lid assembly fabricated from composite materials. The composite materials may be a fiber reinforced polymeric composite having a solid laminate structure or a sandwich laminate structure comprising a plurality of plies. The present invention is directed to a related truck box further comprising a core material disposed between adjacent plies in the sandwich laminate structure. The present invention is directed to another related truck box further comprising hinge and shock absorber combinations and a latching mechanism.

The present invention also is directed to a composite toolbox for a pickup truck. The composite toolbox comprises an open storage box and lid components each independently comprising a ply layup of fiber reinforced polymeric composites, where the lid component is affixed to an upper back edge of the box component in an opening and closing relationship and means for independently hinging and latching the lid component to the open storage box component. The present invention is directed to a related composite toolbox further comprising a surfacing veil disposed on an upper ply of the fiber reinforced polymeric composite. The present invention is directed to another related composite toolbox further comprising a core material disposed between adjacent plies of the fiber reinforced polymeric composite.

The present invention is directed further to a composite toolbox for a pickup truck. The composite toolbox comprises an open storage box and lid components affixed in an opening and closing relationship and independently comprising a solid laminate of a fiber reinforced polymeric composite and means for independently hinging and latching the lid component to the open storage box component. The present invention is directed to a related composite toolbox further comprising a gel coat with or without pigment disposed on an outer surface of the solid laminate.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
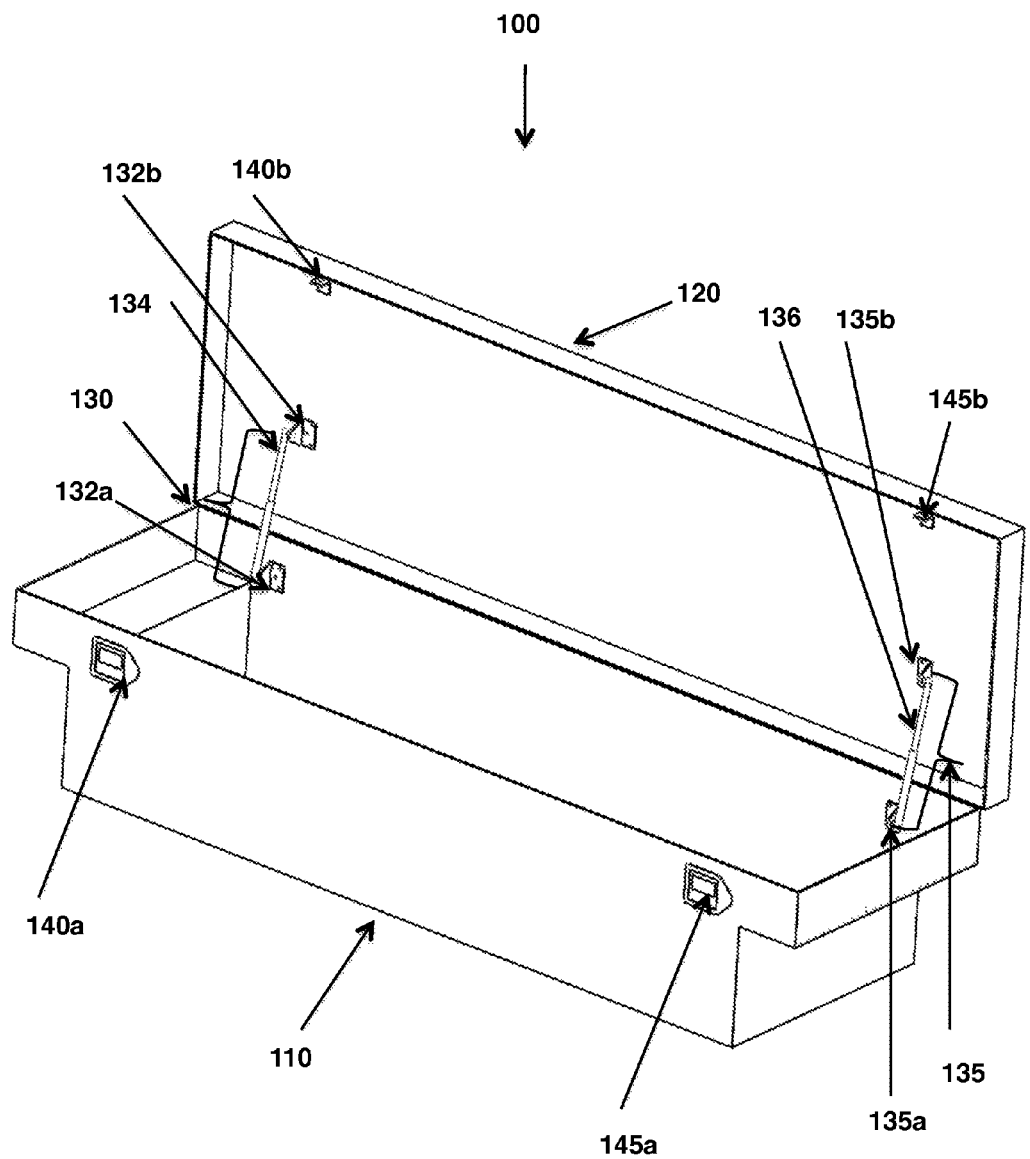
FIG. 1 is a front and side plan view of an open truck box assembly.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

In one embodiment of the present invention there is provided a truck box, comprising an open box body and lid assembly fabricated from composite materials. Further to this embodiment the open box body and lid assembly may comprise hinge and shock absorber combinations and a latching mechanism.

In these embodiments the composite materials may comprise a fiber reinforced polymeric composite having a solid laminate structure or a sandwich laminate structure. Also, the fiber reinforced polymeric composite may have a polymer matrix comprising polyester, vinyl-ester, epoxy, epoxy vinyl-ester resin, or polyurethane. In addition the fiber reinforcement may comprise glass fibers, carbon fibers, basalt fibers, quartz fibers, or a poly-paraphenylene terephthalamide fibers or a combination thereof. Furthermore, the fibers may be stitched, woven or oriented randomly. Particularly, the fibers may be oriented in an x, y, or z direction from 0 degrees to about 90 degrees.

Further still to these embodiment the fiber reinforced polymeric composite may comprise a surfacing veil disposed thereon. In another further embodiment the fiber reinforced polymeric composite may comprise a gel coat with or without pigment disposed thereon. In yet another further embodiment the sandwich laminate structure of fiber reinforced polymeric composite may comprise a core material disposed between adjacent plies thereof. Representative examples of a core material are foam, honeycomb, balsa, PVC or polyurethane.

In all embodiments the open box body and the lid assembly may comprise a single piece box body and a single piece lid or a plurality of joined segments independently forming the box body and the lid. Also, the open box body and lid assembly may be fabricated via a vacuum-assisted resin transfer molding process, a hand-layup process, a pultrusion process, a resin transfer molding process, a compression molding process, or a spray-up process or a combination thereof. In addition the truck box may be mountable on a truck bed in any position.

In another embodiment of the present invention there is provided a composite toolbox for a pickup truck, comprising an open storage box and lid components each independently comprising a ply layup of fiber reinforced polymeric composites, where the lid component is affixed to an upper back edge of the box component in an opening and closing relationship; and means for independently hinging and latching the lid component to the open storage box component.

Further to this embodiment the composite toolbox comprises a surfacing veil disposed on an upper ply of the fiber reinforced polymeric composite. In another further embodiment the composite toolbox comprises a core material disposed between adjacent plies of the fiber reinforced polymeric composite. The core material may be as described supra.

In all embodiments the fiber reinforced composite may have a polymer matrix with fiber reinforcement as described supra where the fibers may be stitched, woven or oriented randomly in an x, y, or z direction from 0 degrees to about 90 degrees. Also, in all embodiments the open storage box component and the lid component each comprise a single piece or each comprise a plurality of joined segments independently forming the same. In addition the composite toolbox is mountable in the pickup truck bed in any position.

In yet another embodiment of the present invention there is provided a related composite toolbox for a pickup truck comprising an open storage box and lid components affixed in an opening and closing relationship and independently comprising a solid laminate of a fiber reinforced polymeric composite; and means for independently hinging and latching the lid component to the open storage box component. Further to this embodiment the composite toolbox may comprise a gel coat with or without pigment disposed on an outer surface of the solid laminate.

In all embodiments the fiber reinforced composite may have a polymer matrix with fibers as described supra. Also, in all embodiments the open storage box component and the lid component may independently comprise single or joined segments as described supra. In addition the composite toolbox is mountable in the pickup truck bed in any position.

Provided herein are truck boxes fabricated of lightweight, durable composite materials. The truck boxes, for example, but not limited to a pickup truck toolbox, may have a shape or configuration with components or an assembly comprising at least an open box, such as for storage, and a lid. The lid may be affixed to the box as is known and standard in the art such that it may be closed to completely cover the open box and opened to allow easy access to the contents therein. The truck box components and assembly may further comprise means for limiting how far the lid may be opened and/or for preventing the lid from slamming shut over the box. For example, but not limited to such, the truck box may comprise one or more hinge and gas shock absorber combinations. The truck box also may comprise a latching mechanism, for example, a draw latch or paddle latch, such as is known and standard in the art. Both of the hinges and the latching mechanism may independently be affixed, secured or attached to the open box and lid via standard means such as rivets or suitable adhesive.

The truck boxes disclosed herein may be mounted in any position on the truck bed. For example, the truck box may have a configuration to sit on and be secured to the top of truck bed rails. Alternatively, the truck box may rest on the truck bed floor and be secured to the sides of one of the bed rails.

The composite materials from which the truck box is fabricated comprise a fiber reinforced polymeric composite. The polymeric composite has a matrix comprising, for example, but not limited to, polyester, vinyl-ester, epoxy, an epoxy vinyl-ester resin, or polyurethane. The fibers utilized for reinforcement of the composite may be one or more of glass fiber, carbon fiber, basalt fibers, quartz fiber, and Kevlar®, a poly-paraphenylene terephthalamide fiber product of DuPont. These fibers may be stitched or woven into the composite material and may be oriented in any of an x, y or z direction from 0 to about 90 degrees.

The fiber reinforced polymeric composite may have a solid laminate structure or may comprise a plurality of plies or ply layup in a sandwich structure. The plies may comprise the same or different matrix materials with the same or different reinforcing fibers. The fiber reinforced polymeric composite may have a top or an outer ply layer comprising a surfacing veil. A gel coat may be applied to the fiber reinforced polymeric composite whether comprising a solid laminate or ply layup structure. Alternatively, the gel coat may comprise a pigment.

The ply layup may comprise a core structure disposed between adjacent plies comprising the sandwich structure. The core structure may be formed of lightweight materials such as, but not limited to, foam, honeycomb, balsa, PVC, or polyurethane.

The truck box may be fabricated or manufactured from the composite materials as single piece open box and lid components. Alternatively, the open box and lid each may independently comprise a plurality of segments joined together. The segments may be joined, for example, via adhesive bonding or composite overwraps. The truck box may be fabricated via methods comprising a vacuum-assisted resin transfer molding (VARTM) process, a hand-layup process, a pultrusion process, a resin transfer molding (RTM) process, a compression molding process, or a spray-up process or a combination thereof As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 depicts a truck box with lid open substantially fabricated from composite materials. The truck box 100 comprises an open box or box body 110 and a lid 120 affixed to the box along the back upper edge 112 in an opening/closing relationship thereto. A pair of hinge/shock absorber combinations 130 and 135 are affixed to the lid and open body inner surface of the lid in parallel at opposite ends of the open truck box. Each hinge/shock absorber combination comprises a pair of hinges 132a,b and 136a,b with the shock absorber 134,138 hingedly secured to each. The latching mechanisms 140a,b and 145a,b are disposed on the open box body and lid such that when closed, the components of the latching mechanism may be fastened. It is to be noted that even though the composite materials forming the truck box are significantly lighter in weight than a standard truck box, the composite truck box need not sacrifice size and capacity. The composite materials are well-able to accommodate what a standard truck box can carry.

Figure 2:
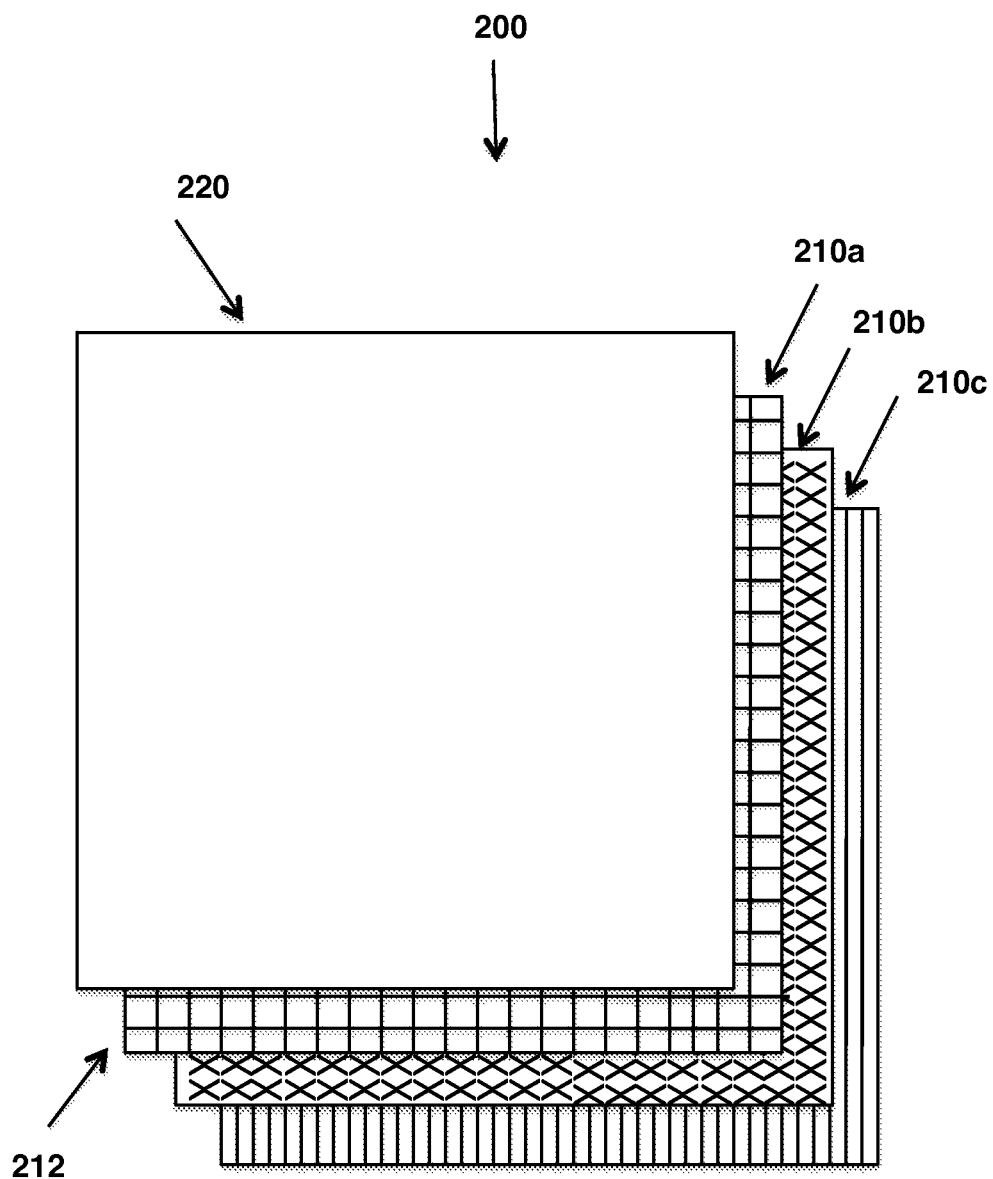
FIG. 2 is an exploded view of a ply layup of fiber reinforcing materials.

FIG. 2 illustrates an exemplary ply layup useful in the manufacture of a composite truck box. The ply layup 200 comprises a plurality of structural plies 210a,b,c and a surfacing veil 220 disposed in a covering relationship to the mold side 212 or finished or smooth side of the structural ply layup. Although not limited to this layup configuration and number of plies, as depicted, the ply layup comprises three plies of different fiber reinforced materials as described herein.

Figure 3A:
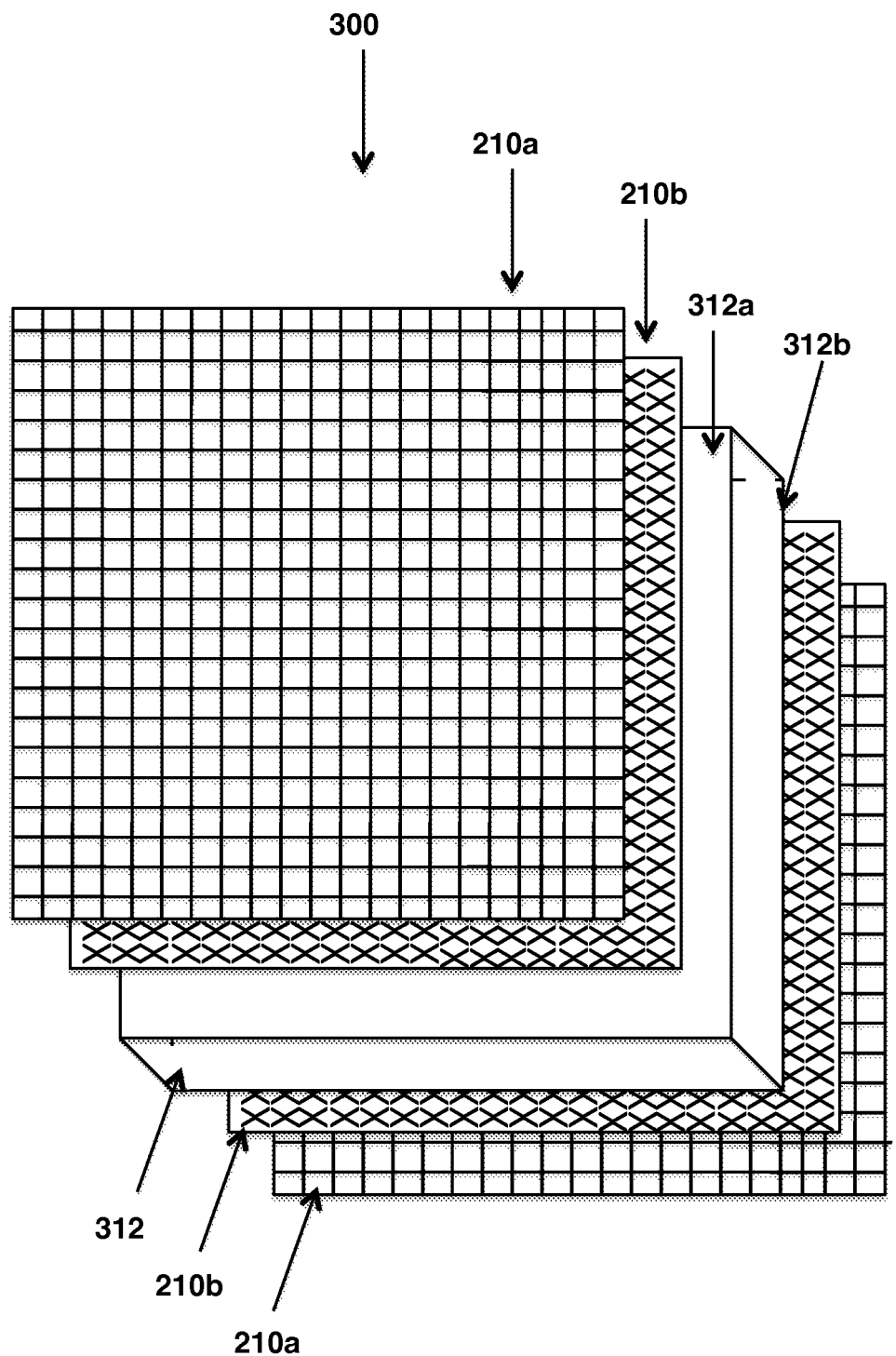
FIG. 3A is an exploded view of a ply layup of fiber reinforcing materials comprising a core structure.
Figure 3B:
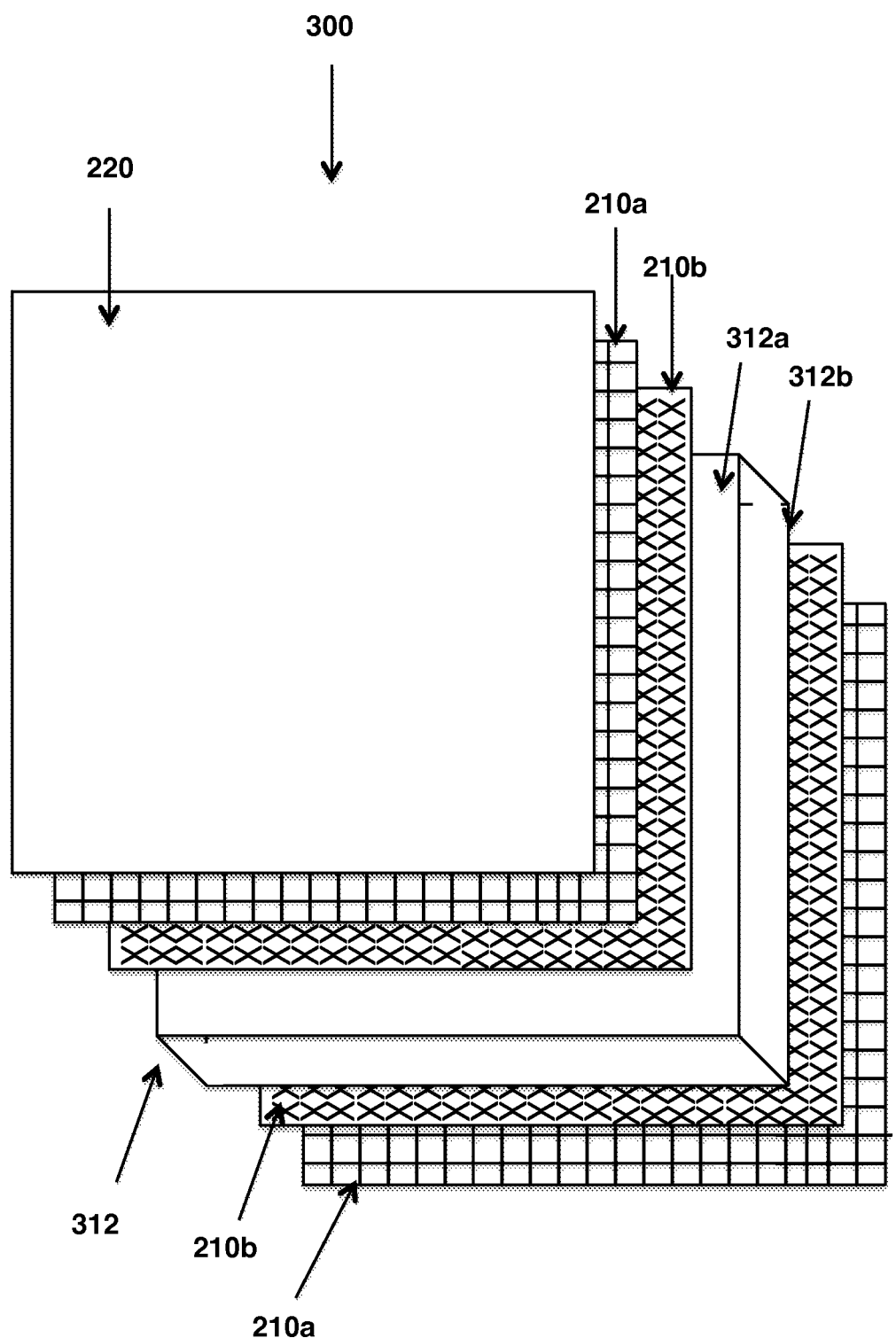
FIG. 3B is the exploded view shown in FIG. 2 comprising a surfacing veil.

With continued reference to FIG. 2, FIGS. 3A-3B illustrates a sandwich structure layup of fiber reinforcing materials. In FIG. 3A the layup 300 comprises a core 310 sandwiched between ply layups comprising structural plies 210a,b at the upper 312a and lower 312b surfaces of the core. In FIG. 3B, the surfacing veil 220 is disposed over ply 210a. As with the structural plies depicted in FIG. 2, the sandwich structure layup is not limited to 2 upper plies and 2 lower plies.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A truck box, comprising:
an open box body and lid assembly each independently fabricated from composite materials comprising a fiber reinforced polymeric composite having a solid laminate structure or a sandwich laminate structure with a surfacing veil or a gel coat with or without pigment disposed on the reinforced polymeric composite, said open box body and said lid assembly comprising a single piece box body and a single piece lid or a plurality of joined segments independently forming the box body and the lid.

2. The truck box of claim 1, wherein the open box body and lid assembly further comprises hinge and shock absorber combinations and a latching mechanism.

3. The truck box of claim 1, wherein the fiber reinforced polymeric composite has a polymer matrix comprising polyester, vinyl-ester, epoxy, epoxy vinyl-ester resin, or polyurethane.

4. The truck box of claim 1, wherein fiber reinforcement comprises glass fibers, carbon fibers, basalt fibers, quartz fibers, or a poly-paraphenylene terephthalamide fibers or a combination thereof.

5. The truck box of claim 4, wherein the fibers are stitched, woven or oriented randomly.

6. The truck box of claim 4, wherein the fibers are oriented in an x, y, or z direction from 0 degrees to about 90 degrees.

7. The truck box of claim 1, wherein the sandwich laminate structure further comprises a core material disposed between adjacent plies thereof.

8. The truck box of claim 7, wherein the core material comprises foam, honeycomb, balsa, PVC, or polyurethane.

9. The truck box of claim 1, wherein the open box body and lid assembly are fabricated via a vacuum-assisted resin transfer molding process, a hand-layup process, a pultrusion process, a resin transfer molding process, a compression molding process, or a spray-up process or a combination thereof.

10. The truck box of claim 1, wherein the truck box is mountable on a truck bed in any position.

11. A composite toolbox for a pickup truck, comprising:
an open storage box and lid components each independently comprising a ply layup of fiber reinforced polymeric composites, said lid component affixed to an upper back edge of the box component in an opening and closing relationship and said open storage box component and said lid component each comprising a single piece or each comprising a plurality of joined segments independently forming the same; and
a core material disposed between adjacent plies of the fiber reinforced polymeric composite; and
a surfacing veil disposed on an upper ply of the fiber reinforced polymeric composite; and
means for independently hinging and latching the lid component to the open storage box component.

12. The composite toolbox of claim 11, wherein the core material comprises foam, honeycomb balsa, PVC, or polyurethane.

13. The composite toolbox of claim 11, wherein the fiber reinforced polymeric composite has a polymer matrix comprising polyester, vinyl-ester, epoxy, epoxy vinyl-ester resin, or polyurethane.

14. The composite toolbox of claim 11, wherein fiber reinforcement comprises glass fibers, carbon fibers, basalt fibers, quartz fibers, or a poly-paraphenylene terephthalamide fibers or a combination thereof.

15. The composite toolbox of claim 14, wherein the fibers are stitched, woven or oriented randomly in an x, y, or z direction from 0 degrees to about 90 degrees.

16. The composite toolbox of claim 11, wherein the composite toolbox is mountable on a pickup truck bed in any position.

17. A composite toolbox for a pickup truck, comprising:
an open storage box and lid components affixed in an opening and closing relationship and independently comprising a solid laminate of a fiber reinforced polymeric composite, said open storage box component and said lid component each comprising a single piece or each comprising a plurality of joined segments independently forming the same; and
a gel coat with or without pigment disposed on an outer surface of the solid laminate; and means for independently hinging and latching the lid component to the open storage box component.

18. The composite toolbox of claim 17, wherein the fiber reinforced polymeric composite laminate has a polymer matrix comprising polyester, vinyl-ester, epoxy, epoxy vinyl-ester resin, or polyurethane.

19. The composite toolbox of claim 18, wherein fiber reinforcement comprises glass fibers, carbon fibers, basalt fibers, quartz fibers, or a poly-paraphenylene terephthalamide fibers or a combination thereof.

20. The composite toolbox of claim 18, wherein the fibers are stitched, woven or oriented randomly in an x, y, or z direction from 0 degrees to about 90 degrees.

21. The composite toolbox of claim 17, wherein said composite toolbox is mountable on a pickup truck bed in any position.

* * * * *